FOLDED PLATE STRUCTURES AND COMPONENTS THEREFOR

Filed Jan. 8, 1969 6 Sheets-Sheet 1

INVENTOR
ARPAD KOLOZSVARY
BY Shanley & O'Neil
ATTORNEYS 3,557,501
FOLDED PLATE STRUCTURES AND COMPONENTS THEREFOR
Arpad Kolozsvary, 180 Morris Ave., Mountain Lakes, N.J. 07046
Continuation-in-part of application Ser. No. 537,829, Mar. 25, 1966. This application Jan. 8, 1969, Ser. No. 789,845
Int. Cl. E04b *2/82*
U.S. Cl. 52—81 18 Claims

ABSTRACT OF THE DISCLOSURE

A universal folded plate component for structures, fastening means for joining such components together and structures comprising such components, the components themselves and the fastening means being designed so that the folded plate components can be connected in the same or reversed fold position relative to one another to thereby build up structures having all curved configuration, all straight configuration or curved and straight configuration combined and having a variety of different ground plans.

CROSS-REFERENCES TO RELATED APPLICATIONS

The present application is a continuation-in-part application of my now abandoned prior copending United States patent application filed Mar. 28, 1966, Ser. No. 537,829, for Universal Folded Plate Shell Structures.

BACKGROUND OF THE INVENTION

Folded plate structures belong to the family of space structures which derive their strength and stability from a three-dimensional or spatial equilibrium of external and internal forces. Since their strength is to a large extent the function of their geometry, space structures are very efficient in their use of materials. Considerable savings in labor can also be realized by subdividing the space structure into smaller components which can be prefabricated using mass production machinery and methods and reducing on-site construction work to the mere assembly of components.

Folded plate structures are eminently suited for prefabrication since they comprise planar surfaces and straight joints. A most efficient prefabricated folded plate component is a diamond shaped plate, folded along its longer diagonal. The advantages of using folded diamond plates in building structures have already been recognized in the past and there are known designs of structural assemblies of folded diamond components, such as the cylindrical barrel vault, an adaption in form of the ancient Japanese lantern, and various dome structures built either with the geodesic principle or to the shape of the Scandinavian folded umbrellas.

While these known structures have clearly demonstrated the strength, stability and economy of folded diamond plate assemblies, it has also become evident that their practical usefulness is limited by the overall configurations of these structures. Each of the known folded diamond component assemblies approximates a surface with a constant curvature defined by a radius which in turn is the function of the components' dimensions. Therefore each structure having a different span and radius of curvature requires a different set of components and this makes the dimensional standardization and mass production of a single component type impractical. Moreover, each structure of the prior art requires at least three dimensionally different component types, the only exception being the cylindrical barrel vault, which can be assembled from identical components; however, its span is limited to less than four times the component length for structural reasons.

In the last case the reason for the prior art being limited to structures of cylindrical barrel vault shape is the manner in which the single type of component units are positioned. Each folded diamond has a concave or valley side and a convex or ridge side. In the structures of the prior art all the identical folded diamond components are in the same fold positions, i.e. all components face the structures' exterior with their concave or valley sides. This practice has resulted from lack of vision in the prior art coupled with unavailability of prior art means for connecting identical components in other than identical relationship.

Figure 1:
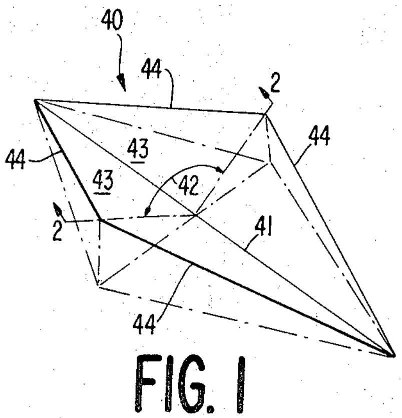
FIG. 1 is a diagrammatic, perspective view of the basic folded diamond component.
Figure 10:
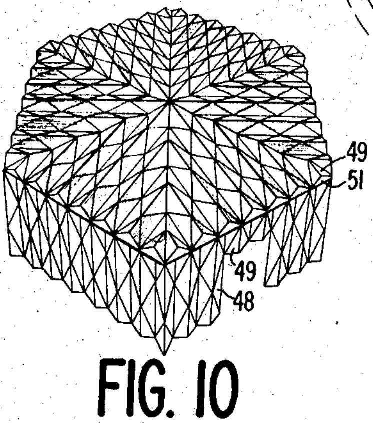
Figure 15:
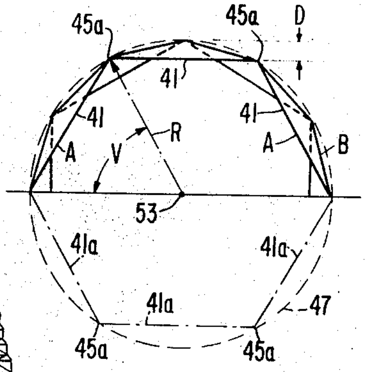
Figure 11:
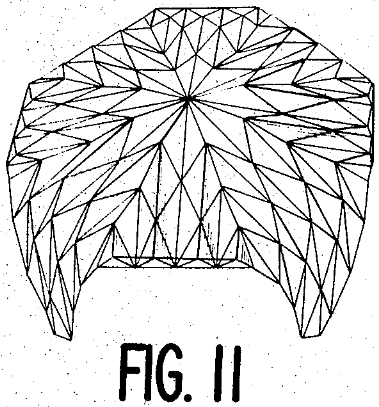
Figure 14:
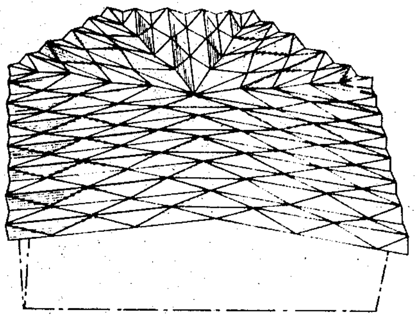
Figure 12:
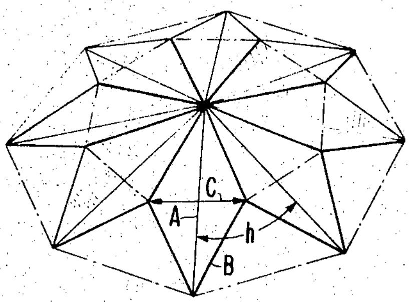
Figure 13:
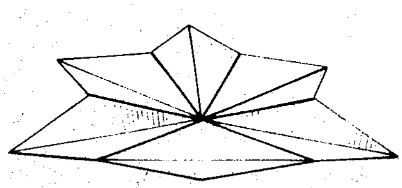
Figures 16, 17:
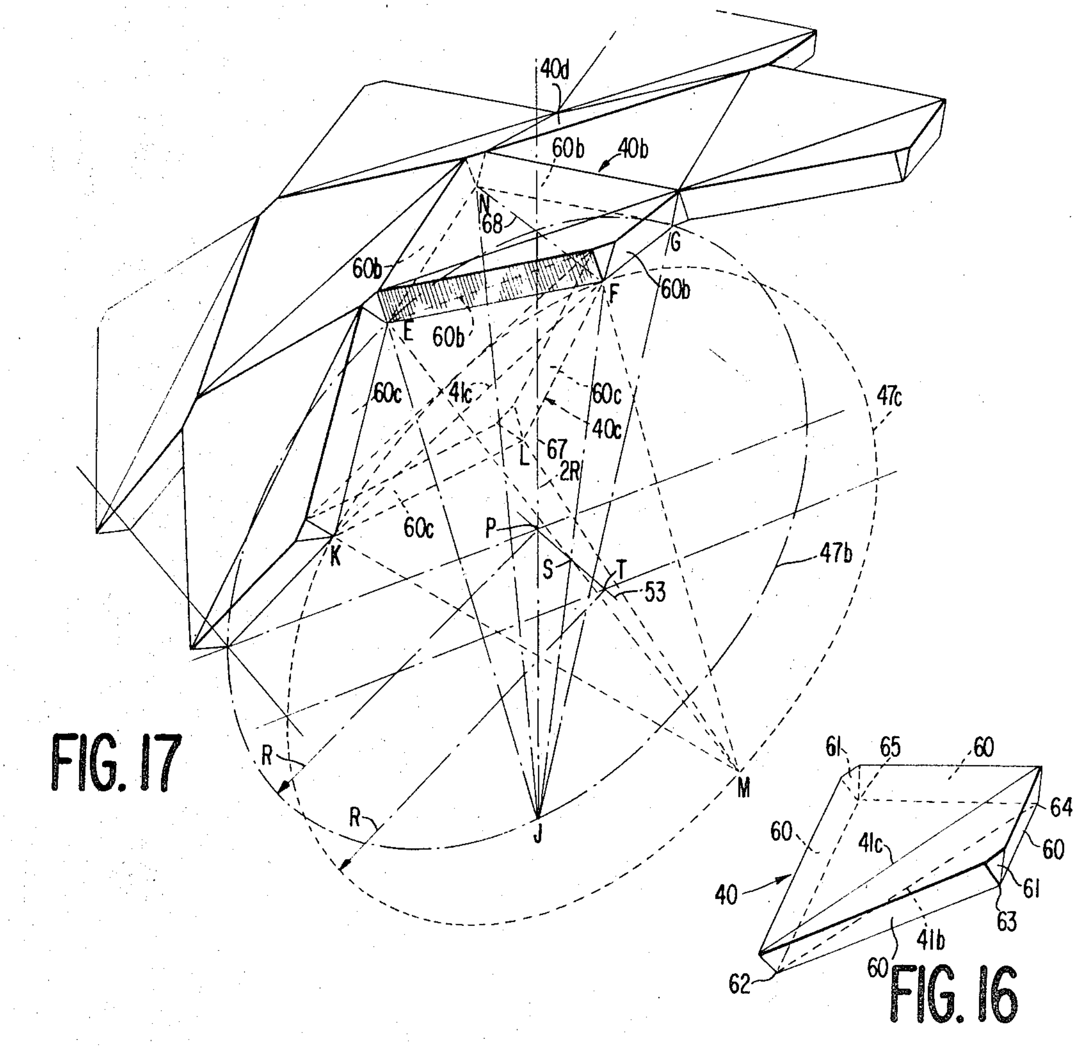
Figure 18:
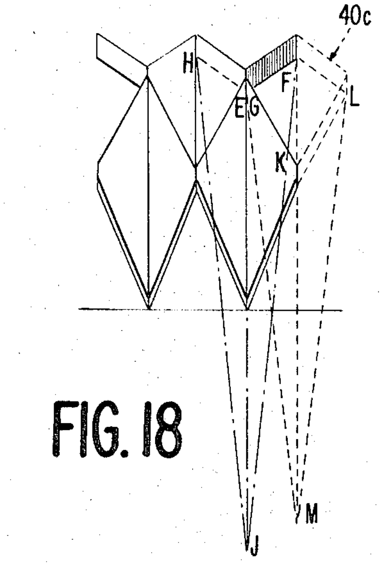
Figure 19:
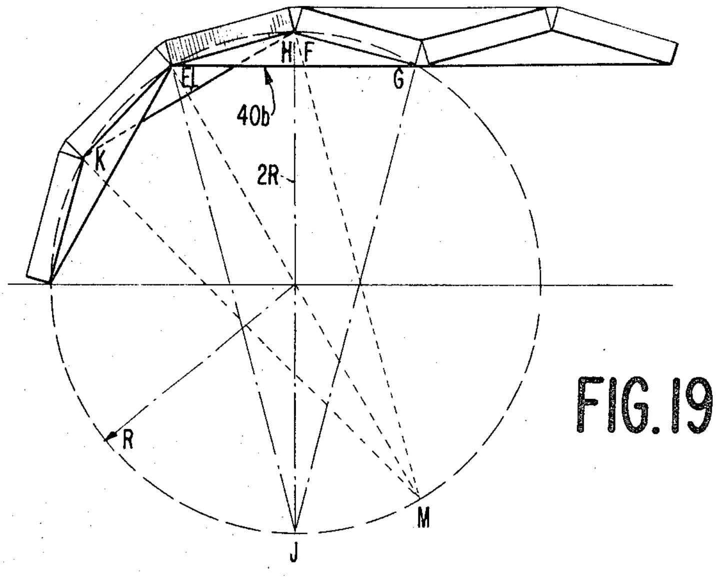
Figure 32:
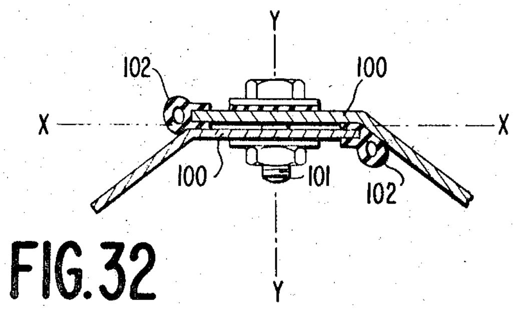
Figure 33:
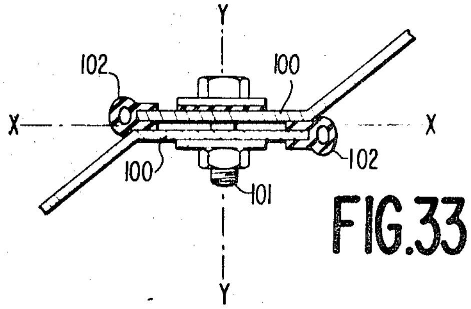
Figures 34, 35, 36, 37, 38:
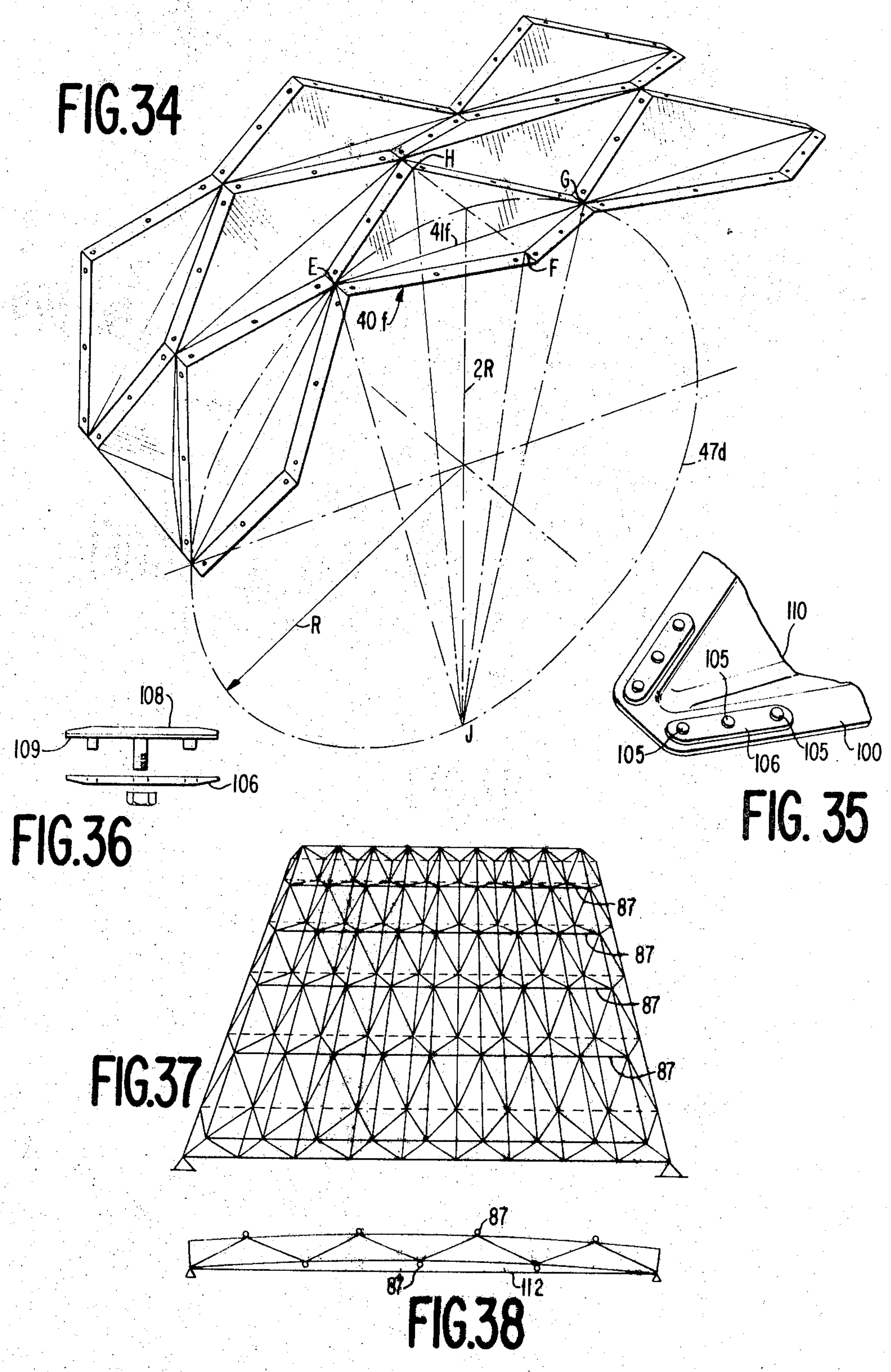

FIG. *9a* is a diagrammatic, perspective view of a horizontally disposed radial assembly of four components of FIG. 1;

FIG. *9b* is a diagrammatic, perspective view of a radial assembly of four components for a sloping structure, the vertical projection lines between FIGS. *9a* and *9b* showing how the diamond shaped plates of FIG. *9a* become deltoid shaped plates in the structure of FIG. *9b*;

FIG. 10 is a perspective view of structure assembled from folded diamond shaped components;

FIG. 11 is a perspective view of a structure assembled from folded diamond shaped components;

FIG. 12 is a partially diagrammatic, perspective view of a radial assembly comprising eight components of FIG. 1;

FIG. 13 is a perspective view of a conversion assembly comprising five radial disposed and one parallel disposed components of FIG. 1;

FIG. 14 is a partially diagrammatic, perspective view of a structure assembled from radially and parallel disposed folded diamond shaped and deltoid shaped components;

FIG. 15 is a partially diagrammatic end elevational view of a cylindrical barrel vault assembly of folded diamond shaped components, its partial mirror image below ground level being shown in phantom lines;

FIG. 16 is a partially diagrammatic, perspective view of a component similar to the component of FIG. 1 but having two spaced, parallel main surfaces;

FIG. 17 is a partially diagrammatic, fragmentary perspective view of a structural assembly comprising a plurality of the components shown in FIG. 16;

FIG. 18 is a partially diagrammatic view in a side elevation of the structural assembly of FIG. 17;

FIG. 19 is a partially diagrammatic, fragmentary view in end elevation of the structural assembly of FIG. 17;

FIGS. 20 through 33 are fragmentary, cross sectional detail views of various forms of component joints, the even numbered views being ridge joints and the odd numbered views being coplanar joints;

FIG. 34 is a partially diagrammatic, fragmentary, perspective view of a structural assembly comprising a plurality of single-skin components having the flange-type marginal connection means shown in FIGS. 32 and 33;

FIG. 35 is a fragmentary, perspective view of component connecting structure;

FIG. 36 is an exploded view of a modification of the connecting structure of FIG. 35;

FIG. 37 is a partially diagrammatic, perspective view of a space frame assembled from folded diamond components and transversal stiffener rods; and FIG. 38 is a partially diagrammatic, side elevational view of the space frame of FIG. 37 showing post-tensioning.

DETAILED DESCRIPTION

Figure 2:
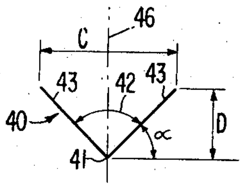
FIG. 2 is a diagrammatic view in cross section of the component of FIG. 1 taken on the line 2—2 of FIG. 1 and in a plane perpendicular to its fold line.

FIGS. 1 and 2 show the basic structural component 40, which is obtained by folding a flat, diamond shaped plate along its longer diagonal 41, thereby creating a dihedral angle 42, which is enclosed by two identical, triangular portions 43 of the component 40, each triangular portion 43 having free or joint edges 44.

The term diamond shaped generally describes a rhombus which has four sides identical in length, two obtuse and two acute angles, and is symmerical about both of its diagonals, therefore it can be folded symmetrically along either of its diagonals, the longer one being preferred. The basic component 40 may also have the shape of a folded deltoid. The term deltoid is used herein to describe a four sided figure having one pair of contiguous sides identical to each other and the other pair of contiguous sides identical to each other but different in length than the first pair. This results in only two opposite corners of the four corners of the figure having identical angles and therefore a flat plate having this shape can be symmetrically folded only along one of its diagonals. A square flat plate can also be used folded along either diagonal. In every case the flat plate is in the form of a symmetrical quadrilateral in which at least one axis of symmetry extends between two opposite corners of the quadilateral. In this specification and in the appended claims the term symmetrical quadrilateral is used to define such a figure.

A primary object of this invention is to provide a folded symmetrical quadrilateral plate component which can be interconnected with a plurality of dimensionally identical components in a number of different relative positions to provide the greatest possible variety of structural assemblies. Therefore the component of the invention should preferably meet two criteria: (a) the component's overall dimensions, such as length of fold line 41 and length of joint edges 44 or degrees of fold angle 42, shall satisfy the geometric requirements of all the desired structural assemblies; and (b) the component's joint edges 44 shall assure the formation of precisely aligning, structurally dependable connections between contiguous joint edges of adjoining components, regardless of the relative positions of their fold angles and fold lines. FIGS. 3, 4, 5 and 9*a* show the four basic subassemblies of four components 40 assembled around one common point of juncture or nodal point 45. Each of the structural assemblies of this invention contains at least one of these subassemblies, which are different from each other due to their components' relative positions, meaning the directions of both the fold angle and the fold line. The directions of the fold angles of two adjoining components may be identical, i.e. both pointing in the same direction, or one may be reversed. The direction of their fold lines may be best described by the positions of the components' longitudinal planes of symmetry 46 taken through their fold lines 41, as seen in FIG. 2 and these planes of symmetry of two adjoining components may be either parallel or intersecting.

Figure 3:
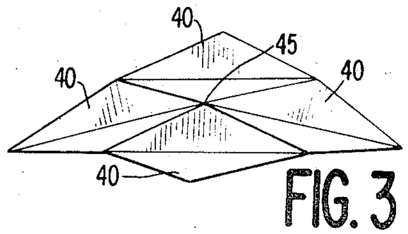
FIGS. 3, 4 and 5 are perspective views of parallel assemblies comprising four components of FIG. 1.
Figure 4:
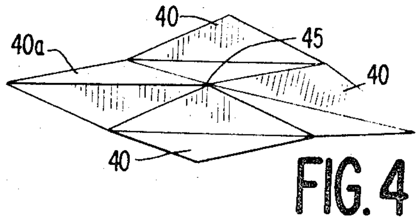
Figure 5:
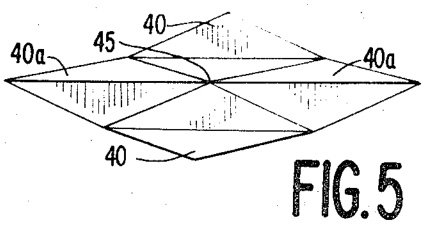
Figures 9A, 9B:
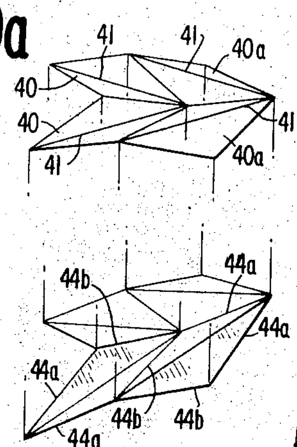

In the subassemblies of FIGS. 3, 4 and 5 the components' longitudinal planes of symmetry 46 are parallel. Therefore they will be referred to as parallel subassemblies and the structures made up solely of parallel subassemblies will be designated parallel structures. A different subassembly is shown in FIG. 9*a* in which the components' longitudinal planes of symmetry 46 are intersecting in pairs. This subassembly will be referred to as convergent subassembly and will be used in radial structures.

PARALLEL STRUCTURES

Considering first the parallel subassemblies, FIG. 3 shows the four components 40 in identical fold positions with their concave or valley sides facing upwards. The well known cylindrical structure of FIG. 15, in which all components are in identical fold positions and in which all nodal points of any cross section lie in a circle 47, comprises solely the subassembly of FIG. 3. This, however, is not the only possible parallel subassembly.

By reversing the fold position of one component 40*a*, the subassembly can be straightened out in the direction of that unit 40*a*, as shown in FIG. 4 and by reversing the fold positions of two components 40*a* with a common longitudinal plane of symmetry 46, as shown in FIG. 5, the subassembly can be straightened out in both directions. A plurality of the subassemblies shown in FIG. 5 can therefore become a flat, folded plate structure, such as a flat, sawtooth roof or a retaining wall, while the subassembly of FIG. 4 can be employed as a transition between curved and straight portions of structures.

Figure 7:
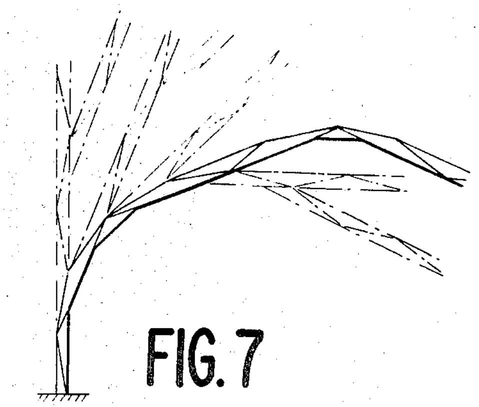
FIG. 7 is a fragmentary, and elevational view of a structure similar to FIG. 6, alternative sectional formations being shown in phantom lines.
Figure 6:
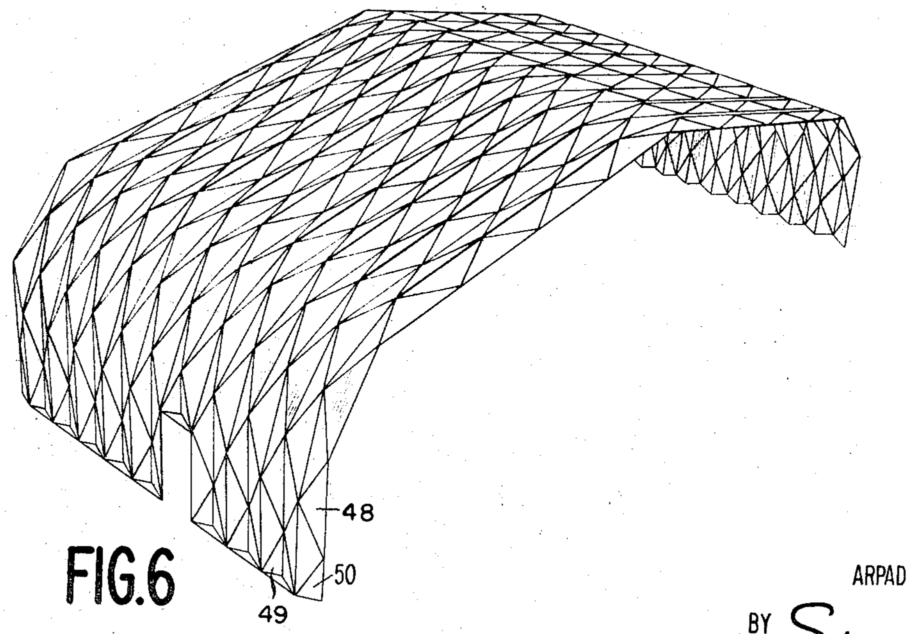
FIG. 6 is a perspective view of a structure comprising the assemblies shown in FIGS. 2, 3 and 4.
Figure 8:
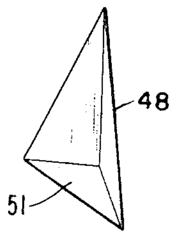
FIG. 8 is a perspective view of a transversal half component unit.

A perspective view of a structure comprising all three parallel subassemblies is shown in FIG. 6. A partial cross end elevational view of a similar structure is seen in FIG. 7, with alternate configurations shown in phantom lines. To terminate the structures in a straight line, longitudinal half 48 and transversal half 49 units as shown in FIG. 8 are also required; however, these are exact halves of the basic unit 40 and therefore do not represent a different component type. Quarter units 50 (see FIG. 6) if required, can be similarly obtained by the further subdivision of half units.

The transversal half unit 49, shown in FIG. 8, has a triangular cross plate 51 coexistent therewith, which serves as a load distributing base plate for the structure when resting on the ground or on a foundation. Such transversal half units 49, together with longitudinal half units 48 (see FIG. 6), can also be used to form rectangular openings for doors or windows, as seen in FIGS. 6 and 10. FIG. 10 also illustrates the use of transversal half units 49 with their cross plates 51 in the angular connection of straight roof and wall sections of a structure.

RADIAL STRUCTURES

FIG. 9*a* shows the convergent subassembly of four interconnecting components, having two components 40 in concave, and two components 40*a* in convex fold positions with reference to one side of the subassembly, their fold lines 41 being so oriented that the components in identical fold positions have intersecting longitudinal planes of symmetry. This convergent subassembly is used in radial structures, such as the one shown in FIG. 10, having a polygonal ground plan, straight vertical walls and a flat, folded roof.

Polygonal pyramids, or radial structures with a raised center point, such as the structure shown in FIG. 11, can also be assembled from identical folded plate components, however these components are folded deltoids with two longer joint edges 44*a* and two shorter joint edges 44*b*. FIG. 9*b* shows such a radial subassembly of identical folded deltoids, and this figure, taken with FIG. 9*a*, indicates that the proportionate lengths of the longer edges 44*a* and shorter edges 44*b* are designed in accordance with the subassembly's inclination to the horizontal plane, their horizontal projections being identical in length.

Since the structure of FIG. 11 combines all four subassemblies, i.e. three parallel and one convergent, it is evident that each of these subassemblies can comprise folded deltoids as well as folded rhombuses, and therefore folded deltoids could be selected as standard components for all structures of this invention. However, it may be deemed more practical to select a folded rhombus for the standard component and to use additional folded deltoids in polygonal pyramids, as the need for such structures may be limited in comparison with parallel structures. If the longer joint edges 44*a* of a folded deltoid component are identical with the joint edges 44 of a folded rhombus, and their fold angles 42 are also identical, the two component types can be used together in a single structure.

Of course, the factor of manufacturing tolerances applies to all the critical dimensions, angles, and planes described in this specification. These practical considerations must be kept in mind throughout this specification and in the interpretation of the claim language so as to embrace departures from ideal conditions which take place in mass production and under field erection conditions. Use of the term "substantially" has been avoided in the claims because it is understod that proper interpretation of claim language in situations like the present make the inclusion of this term unnecessary.

COMBINATION PARALLEL AND RADIAL STRUCTURES

Since it is a primary object of this invention to provide prefabricated folded diamond components which can be interconnected to form parallel or radial structures as well as combinations of both, the overall dimensions of such units are designed to satisfy the geometric coordinates of parallel as well as radial structures. To determine these coordinates the invention utilizes the concept of vertical and horizontal module polygons.

The vertical module polygon is characteristic of parallel structures, and relates directly to a cylindrical assembly as shown in FIG. 15, where the connecting long fold lines 41 are the sides A of a polygon of which one half is below ground level and is shown in phantom lines 41*a*. All corner points 45*a* of this polygon are at R distance from the centerline 53 of the assembly and therefore they lie in main circle 47 of the cylindrical approximated surface. FIG. 15 shows a hexagon or six-sided polygon, which can be written $N_v=6$. The practical range of values for $N_v$ is between 4 and 16 or worded differently, the angle v subtended by the chord formed by a side A of the polygon can vary between 90° and 22°30′. This means that the radius R of the circle 47 can be computed using the equation:

$$R=\frac{A}{2}\,CSC\,\frac{v}{2} \qquad (1)$$

As seen in FIG. 15, the vertical module polygon determines the component's depth D (see FIG. 2 also) which increases as the value of $N_v$ decreases. For instance if $N_v=6$, $D=0.134A$, and if $N_v=8$, $D=0.0994A$, where, as mentioned above, A is the length of the long fold line 41. The mathematical expression of this relation is:

$$D=\frac{A}{2}\left(\frac{1}{\sin\frac{180°}{N_v}}-\frac{1}{tg\frac{180°}{N_v}}\right) \qquad (2)$$

or written in terms of the angle $v$:

$$D=\frac{A}{2}\left(\frac{1}{\sin\frac{v}{2}}-\frac{1}{tg\frac{v}{2}}\right) \qquad (3)$$

The horizontal module polygon is characteristic of radial structures, such as those shown in FIGS. 10 and 11. The group of components meeting at the center point and resembling a star formation is shown enlarged in FIG. 12, with the horizontal module polygon indicated by phantom lines. The number of components in the star assembly illustrated being eight, the horizontal module polygon is an octagon, $N_h=8$. The radial structure of FIG. 10 is based on $N_h=6$.

As seen in FIG. 12, the horizontal module polygon determines the components' width C (see FIG. 2 also) which increases as the value of $N_h$ decreased. For instance if $N_h=6$, $C=0.577A$, and if $N_h=8$, $C=0.4142A$, where A again designates the length of the fold line 41. The mathematical expression of this relation is:

$$C=A\,tg\,\frac{180°}{N_h} \qquad (4)$$

which applies to all radial structures of this invention, whether flat or pyramidal.

The practical range of values for $N_h$ is also between 4 and 16 or worded differently, the angle $h$ formed between the longitudinal planes of symmetry 46 of contiguous components can vary between 90° and 22°30′. This means that Equation 4 can be written in terms of the angle $h$ as follows:

$$C=A\,tg\,\frac{h}{2} \qquad (5)$$

FIG. 2, which shows the component 40 in cross section, indicates the relationship between width C and depth D of the unit. C being the function of $N_h$ and D being the function of $N_v$, the fold angle 42 is variable if the component is designed solely for parallel or solely for radial structures. However, if the component is to satisfy both parallel and radial structures, as well as combinations of both, this can be accomplished with only one fold angle 42 for each combination. For instance, if $N_v=6$, and $N_h=8$, the fold angle 42 is 114°12′, or $180°-2\beta$, for which $\beta$ can be computed from:

$$tg\,\alpha=\frac{2D}{C}=\left(\frac{1}{\sin\frac{180°}{N_v}}-\frac{1}{tg\frac{180°}{N_v}}\right)\frac{1}{tg\frac{180°}{N_h}} \qquad (6)$$

Components having fold angles according to this design can be used in structures which are in part parallel, in part radial, such as that of FIG. 11 and the one shown in FIG. 14.

A modified star assembly, shown in FIG. 14 and also shown enlarged in FIG. 13, serves as a transition structure between the parallel and radial sections of FIG. 14. It is obtained by having some of the star assembly's radial components replaced by a single component which is in parallel relationship to the two adjoining components. The number of replaced radial units is $0.5N_h-1$. Therefore in the example of FIG. 13 the number of replaced units is 3, since $N_h=8$.

It can be stated without further illustrations that with similar transitional subassemblies a great variety of structures can be assembled, having ground plans in the shape of T, X, Y, Z, etc.

Although vertical and horizontal polygons with an even number of sides have been specifically referred to in the foregoing discussion, it is quite feasible to base structures on polygons having an odd number of sides.

It will be noted that to build combination parallel and radial structures such as shown in FIG. 14, a special folded rhombus component is needed for the top center row of the parallel portion of the structure. The four sides of this component are identical with the shorter sides of the folded deltoid units and therefore the length of the fold line of this rhombus unit is shorter than that of the deltoid unit. So also is the depth of this rhombus unit less than the depth of the deltoid unit while the widths of the two units are the same. This special folded rhombus, while generally conforming to the dimensional relationships of the standard components, is irregular insofar as its $v$ angle is not the same as those of the components used with it to form the structure of FIG. 14.

If the slope of the roof structure in FIG. 14 is slight, such as can be achieved by forming a ridge in a flat roof using supporting poles or by forming an upwardly curved structure using post tensioning, as described below, all the components can utilize rhombus shaped plates, the inherent "give" of the parts and joint connections accommodating the change in shape of the overall structure.

Having thus described the reversible units' overall dimensions as functions of the geometry of the structures assembled therefrom, the connection means of the components will be considered next.

GEOMETRY OF JOINTS

As already mentioned in the preceding, when two folded diamond components are joined in identical relative fold positions, their connecting triangular portions lie in angularly disposed planes creating a fold joint, whereas the connecting triangles become coplanar when the fold position of one component is reversed relative to the other, and therefore the joint also becomes coplanar. If the components are relatively thin, made for instance from a single sheet of metal, reinforced plastic, plywood, or the like, it is relatively simple to connect them in either angular or coplanar joints. These connections may be permanent, made by welding, adhesive bonding, nailing, etc., or the joints may be releasable, as shown by way of illustration in FIGS. 20 and 21, in which a pair of joint plates 55 and 56 are connected by threaded bolts and nuts 57 to both sides of the connecting components' periphery. These joint plates are folded as at 55 for the angular joints, or flat as at 56 for the coplanar joint. They may have a factory applied, compressible elastomeric lining 58 for the purpose of waterseal, but caulking applied during assembly may also be used for the same purpose. Waterseal continuity at the nodal points 45 of joint intersections may be readily accomplished with rigid corner plates overlapping the joint plates 55 or 56, or by using compressible corner sheets, inserted underneath and overlapped by the joint plates 55 or 56.

Figure 22:
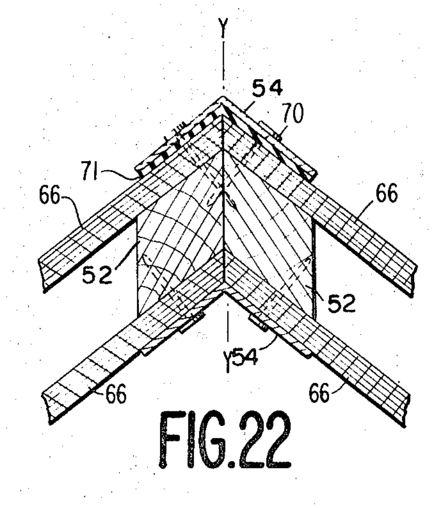
Figure 23:
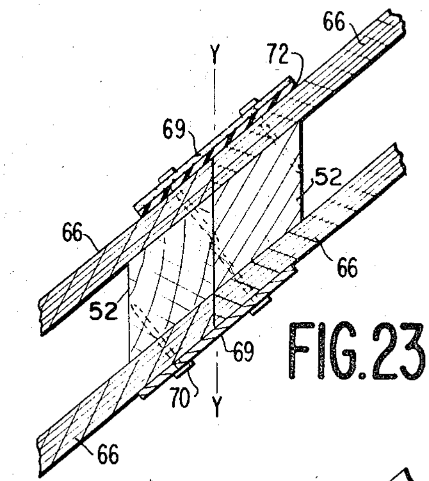

The problem of reversible connections becomes more complex when the components have an appreciable thickness or identical coacting joint forming means are formed integral with each unit. This is frequently the case when the components are made of a substantially homogeneous material or when they have rigid surfacing skins or plate elements and are constructed either as sandwich panels, or, as shown in FIGS. 22 and 23, are made as stressed-skin panels. It is self-evident, that if the cylindrical barrel vault shown in FIG. 15 is assembled from components having an appreciable thickness of the type illustrated in FIGS. 22 and 23, the components' exterior or concave surfaces must be larger than their interior or convex surfaces, in order to have precisely aligning, void free joints as shown. Consequently, where these peripheral joint surfaces are planar they must lie in planes which are inclined towards each other in a pyramidal relation, having one common point at the apex of the imaginary pyramid. In the prior art it was generally assumed that in the cylindrical barrel vault type structure this common point towards which the four planar joints are oriented lies on the centerline 53 of the cylindrical structure. However, I have discovered that components having four laterally abutting planar joint surfaces, no matter how such surfaces are disposed, cannot be connected to provide cylindrical assemblies with void-free, precisely aligning points. The only four joint surfaces capable of void-free connection in such joints are skewed surfaces, more precisely described as hyperbolic paraboloids. Such skewed surfaces would, of course, be exceedingly difficult to fabricate and more important, they could not be reversed.

To obtain perfectly aligning joints with planar surfaces in assemblies of folded diamond components having a larger concave and a smaller convex side in a spaced, parallel relationship, the minimum number of planar joint surfaces is six. These surfaces are, as shown in FIG. 16, four rectangles 60 and two triangles 61. If the rectangular joint surfaces 60 are inclined towards each other so that they are coplanar with the four sides of a 2R high imaginary pyramid, and if the trangles 61 are parallel with the component's longitudinal plane of symmetry 46 (see FIG. 2), then as shown in FIGS. 17, 18 and 19, a plurality of such components can be connected to each other through precisely aligning, void-free joints, regardless of the component's relative fold positions.

FIG. 17 is a perspective view of a structural assembly comprising a plurality of the components 40 shown in FIG. 16, some of the units being arranged in identical fold positions whereas others are in reversed relationship. The assembly therefore has a curved as well as a straight section. FIG. 18 is a side elevation of this assembly and FIG. 19 is a cross section of the same.

To illustrate the geometric principles of this joint formation, one joint is selected for closer analysis. The selected joint is between first component **40*b*, the inwardly facing surface of which is bounded by nodal points E. F, G and H, and second component 40*c*, shown by dotted lines and similarly bounded by nodal points E, F, K and L, which nodal points correspond in both cases to points 62, 63, 64 and 65, respectively, of component 40 in FIG. 16, herein also termed nodal points for convenience. The selected joint, with the rectangular surface shown shaded for greater emphasis, extends between points E and F, which are common to both components 40*b* and 40*c***.

Corner points E and G of the first component **40*b* are points on a first main reference circle 47*b*, shown by a phantom line, with R radius and with its center point P lying on the centerline 53 of the assembly's curved portion. Reference circle 47*b* lies in the plane of symmetry 46 of the unit and fold line 41*b*** constitutes a chord of the circle which subtends the angle *v*, here before referred to. The first main circle **47*b* also contains the apex J of an imaginary first pyramid of which the four side surfaces are coplanar with the four rectangular joint surfaces 60*b* of the first component 40*b*. In the case of a diamond-shaped folded component, as illustrated, apex J will be on a diameter 67 of the first main circle which passes through the midpoint of fold line 41*b***.

The corner points F and K of the second component **40*c* lie on a second main circle 47*c*, shown by a dotted line, which is identical with and parallel to first main circle 47*b* and also has its center point T on centerline 53. The distance between center points P and T is one half of a component's full width, the full width being measured as the length of reference line 68 extending between points H and F, or as the distance between points H and F, or E and L. The second main circle 47*c* also contains the apex M of an imaginary second pyramid, the four side surfaces of which are coplanar with the four rectangular joint surfaces 60*c* of the second component 40*c*. Apex M is similarly located on a diameter of the second main circle 47*c* including the midpoint of fold line 41*c***.

The EF joint, which has been selected for the purpose of illustration, comprises the laterally abutting rectangular joint surfaces **60*b* and 60*c* of the two adjoining components 40*b* and 40*c*, respectively. To provide a perfectly aligning, voidless joint, these surfaces 60*b* and 60*c* must theoretically be in the same plane when connected to each other. It can be readily shown that they are coplanar, since: (a) the joint surface 60*b* of the first unit 40*b* is coplanar with EFJ triangle; (b) the joint surface 60*c* of the second unit 40*c* is coplanar with EFM triangle; (c) triangles EFJ and EFM are identical and their sides FJ and EM intersect at point S which lies on centerline 53** and is equidistant from points P and T; (d) EFJ triangle and EFM triangle have three common points, E, F and S, and are therefore coplanar themselves.

Since reversing the direction of the fold of component **40*b* will place a new joint surface 60*b* of component 40*b* in the identical position as the above described joint surface 60*b*, which new joint surface 60*b*** then forms joint EF of triangle EFJ, it will be apparent that the surfaces of joint EF will coincide regardless of the relative fold positions.

FIGS. 17, 18 and 19 also show how the triangular joint surfaces 61 of two laterally connecting units align with each other, regardless of the components' relative fold positions. The two triangular joint surfaces 61 of each component are parallel to the unit's longitudinal plane of symmetry 56 and one corner or nodal point 63 of each triangular joint surface 61 is coincident with one corner or nodal point of the unit's concave side. Reversing the fold of unit 40*b* would merely reverse the position of the triangular surface 61 without disturbing the effectiveness of the joint. This will be evident from an inspection of component 40*d* of FIG. 17, which component is in reversed fold delation to unit 40*b*.

Modular dimensions A, B, C and D, as described above, apply to the convex side of a component having appreciable thickness, the type shown in FIG. 16. For example, the unit's length A is the length of the ridge fold line 41*b* on the convex side of the component, the valley fold line 41*c* on the concave side becoming increasingly longer as the unit's thickness increases. Similarly, where points, lines, surfaces and planes are referred to in describing and claiming these embodiments, without limitation as to the thickness dimensions of the component, such references are in respect to the convex side of the units.

EXAMPLES OF JOINT STRUCTURES

The geometric principles of this invention, which determine both the component's overall shape and the disposition of joint surfaces, are readily applicable to components of various constructions. Joints between components made of thin plates, shown in FIGS. 20 and 21 have already been mentioned. This joint per se forms no part of the present invention but it can be useful in connection with certain aspects of the present invention. In FIGS. 22 to 29 four different joint types are shown connecting components having an appreciable thickness, the even numbered figures pertaining to ridge joints, the odd numbered figures to coplanar joints. In the "coplanar" connections of some of the joints the connecting portions of the components are not exactly coplanar as their planes are in slightly spaced, parallel relationship with each other; however, in comparison to the structure's other dimensions they are substantially coplanar and for the purposes of simplicity will be herein referred to as such in this specification and the appended claims.

To provide precisely aligning, reversible joints, each joint includes a surface corresponding to a surface 60 of FIG. 16 which lies in or, as described below, is symmetrically disposed in relation to, a plane Y—Y that has the inclined, pyramidal disposition previously described.

FIGS. 22 and 23 show joints between components of the stressed skin type, having plywood skins 66 and wood framing members 52. The connecting surface portions of the components are held in connected relation to each other with folded joint plates 54 or planar 69 joint plates and with nails 70 driven through said joint plates and into the skin 66 and framing member 52. The same joint can be made releasable by using bolts and nuts instead of the nails, similarly to the joint shown in FIGS. 20 and 21. Various known means, such as resilient seal strips 71, 72, can be employed for increased weathering resistance, thermal insulation, and waterseal.

Figure 24:
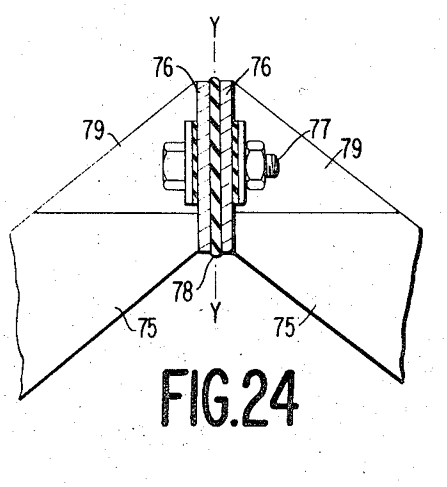
Figure 25:
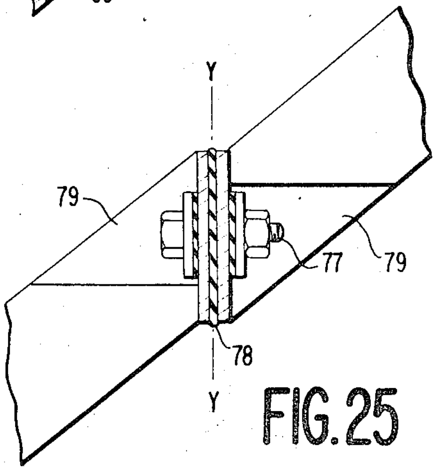

Joints between components made of reinforced concrete 75 are shown in FIGS. 24 and 25. Similar components may also be made of other, substantially homogeneous materials, such as organic and inorganic foams, various boards comprising suitable binders and fibrous or granular fillers, and the like. The peripheral metal framing members 76 also act as connection means and present abutting joint faces, the latter presenting opposed connecting surfaces which correspond to surfaces 60 of FIG. 16. These faces can be permanently welded, adhesive bonded or riveted to each other, or they may be releasably connected by means of bolts and nuts 77, as shown in FIGS. 24 and 25. To secure watertightness at the releasable joints, compressible elastomeric sealants 78 can be permanently attached to the suitably shaped framing members 76. After the bolts have been tightened, their access cavities 79 may be covered or filled with a suitable material, or they may remain exposed if properly waterproofed.

Figure 26:
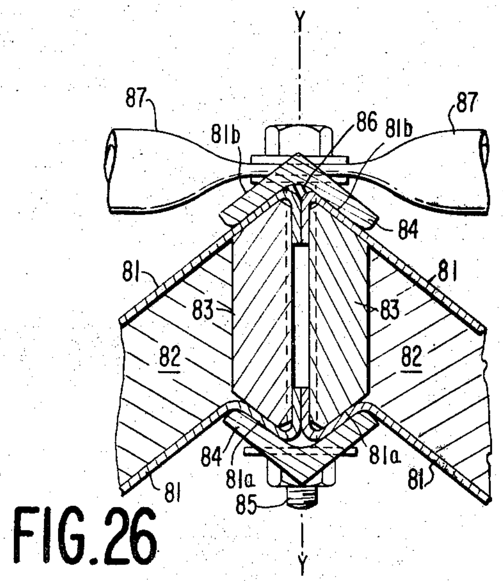
Figures 27, 29:
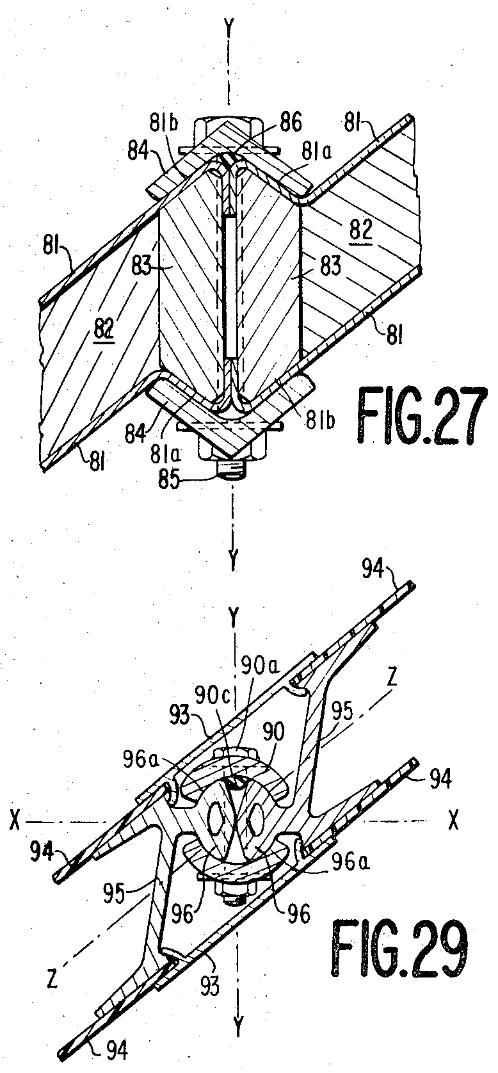

FIGS. 26 and 27 show joints between sandwich-type components, the components having two spaced, parallel skins 81 made of sheets of steel, aluminum, plywood, reinforced plastics and the like. Enclosed between the skins 81 is an insulating core 82 made of cellular concrete, honeycomb, polystyrene or polyurethane foam, or similar lightweight material, and a peripheral framing member 83 made of a suitable material having low thermal conductivity, such as wood or plastics. Each marginal portion of such component is suitably shaped at 81*a* and 81*b* to form connecting surface means for coaction with a pair of identical, folded lockstrips 84, made of metal, reinforced plastics or the like which are coextensive in length with a joint edge of the component. The lockstrips are in a parallel, spaced relationship, adjustably connected to each other by a plurality of spaced bolts and nuts 85. Tightening the bolts and nuts 85 of an assembled joint compresses the lockstrips 84 against portions 81*a*, 81*b* of the component's inclined marginal surfaces, thereby drawing together the components into a tight joint connection in which the framing members and the coacting portions of skins 81 in each component constitute connecting surface means. The coinciding surfaces of framing members 83 correspond to surfaces 60 of FIG. 16, while the bolts 85, being recessed into both abutting framing members 83, become very effective shear keys. A compressible elastomeric sealant 86 is permanently secured to the underside of the exterior lockstrip 84 to assure a watertight joint. FIG. 26 also illustrates the use of a bolt and nut 85 to secure a transversal stiffener member 87 to the assembled structure.

Figure 28:
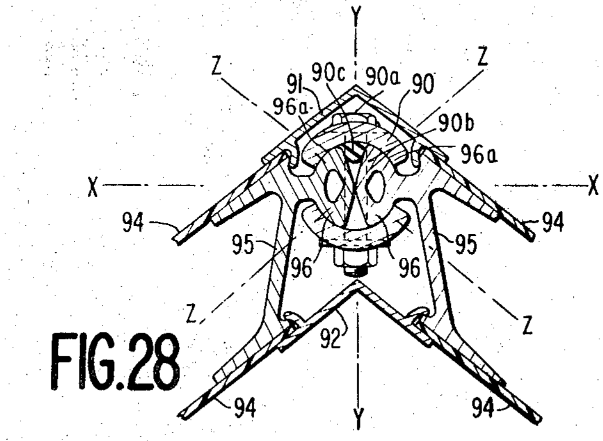

A functionally equivalent joint is shown in FIGS. 28 and 29 in which the connecting means on each component provides for line contact with the connecting means on the adjacent component and where the cylindrically shaped lockstrips 90 are recessed within the outside dimension of the components and are concealed by cover plates 91, 92 and 93. The fastening bolts 90*a* which hold the lock strips 90 may be formed integral with the lockstrips by welding the bolt heads to the lockstrip or in any other suitable manner, to reduce labor costs in the field. The cover plates are folded, 91 and 92 for the ridge joint, flat, 93 for the coplanar joint, and they are of the snap-in type made of a resilient material such as steel or reinforced plastics. The components have two rigid skins 94, which may be translucent reinforced plastics and which are adhesive bonded to extruded framing members 95 made of aluminum or reinforced plastics. Each of said framing members 95 has a marginal joint extension 96 forming a connecting surface means which is coextensive in length with the framing member 95 and which has suitably shaped connecting surfaces to engage the cylindrical lockstrips 90 when the joint is assembled. The geometric principles of this invention apply to the type of joints shown in FIGS. 28 and 29, for the connecting surface means of joint extensions 96 are symmetrically disposed relative to plane X—X and plane X—X must be perpendicular to the Y—Y plane. It will be obvious that each pair of plate elements or skins 94, 94 of a component may be identical, with the frame member 95 accommodating for the discrepancy in size of the concave element.

When two components are joined together in the joint illustrated in FIGS. 28 and 29, the actual contact, e.g. the transfer of internal forces, occurs along the line of contact between extensions 96 and to assure that all internal forces are concentric, the line of contact is preferably located in a plane Z—Z equally spaced from both facing skins. This line of contact is maintained in all variations of the releasable joint, regardless of the relative fold positions of the connecting components. The modular dimensions of the components are measured in the plane Z—Z and therefore the length of the free edges of the components in FIGS. 28 and 29 becomes the length of the line of contact between extensions 96.

To enable the joint faces to make line contact when the locking bolts **90*a* are placed between the joint faces, the joint faces are provided with a plurality of spaced small vertical recesses 90*b*, each of the recesses having a substantially cylindrical inner surface, similar to but slightly larger than the locking bolt 90*a*. The recesses 90*b* are spaced identically with the lock bolts 90*a* so that each recess, together with the identical opposite recess of the abutting joint face of an extension 96** is capable of receiving the lock bolt when the joint is assembled.

It is a most significant advantage of the recesses **90*b* that when the recesses engage with the lock bolts 90*a*** the recesses become very effective shear keys. Shear forces are especially dominant in the coplanar joints of assemblies as shown in FIG. 29, in which assemblies the entire coplanar joint becomes a very effective diagonal shear reinforcement.

It is a novel feature of the releasable joint of FIGS. 28 and 29 that when the joint is locked to provide structural continuity between the connected units, the joint becomes, at the same time, automatically and completely sealed against moisture penetration from the exterior. This is accomplished by means of a suitably shaped, elongated elastomeric gasket **90*c* made of a permanently elastic material, such as neoprene, polysulphide, or silicone rubber, said elastomeric gasket being permanently bonded to the inner or concave side of the exterior lockstrip 90**.

Figure 20:
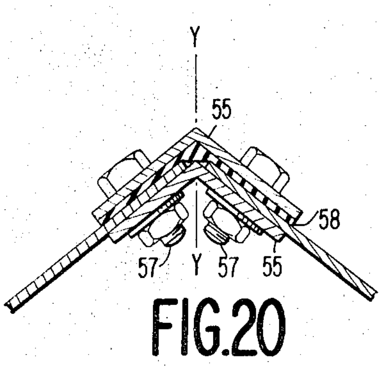
Figure 21:
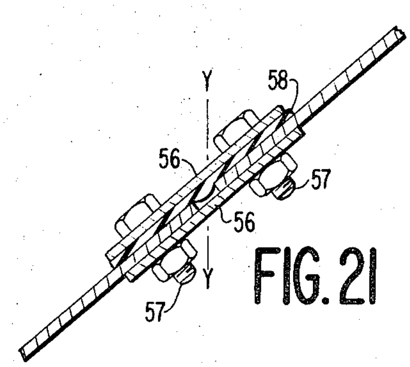
Figure 30:
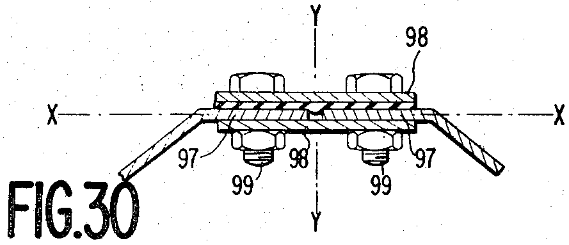
Figure 31:
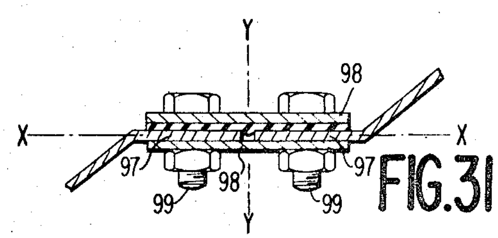

As seen in FIGS. 30 and 31, the marginal joint extensions or connecting surface means of single skin components may be merely flat flanges 97 disposed in plane X—X and the lockstrips then become a pair of flat joint plates 98. Since such flat joint plates 98 do not have the mechanical interlocking capability of the nonplanar lockstrips seen in the previous examples, the flat joint plates 98 require two rows of bolts and nuts 99. An advantage of this joint over the one shown in FIGS. 20 and 21 is that since the flanges 97 of adjoining components are always in plane X—X regardless of the components' relative fold positions, the same flat joint plates 98 can be used for both coplanar and ridge joints.

A preferred joint for single skin components is shown in FIGS. 32 and 33, requiring no joint plates and only one row of bolts and nuts. In this type of joint the joint flanges or connecting surface means 100 of two adjoining components are overlapping in plane X—X and are secured to each other by bolts and nuts 101. Moisture penetration through the joint is prevented by a compressible elastomeric sealant 102 which is either adhesive bonded to the extreme periphery of the flanges 100, as shown in FIGS. 32 and 33, or is provided in the form of a strip and is placed between the joint flanges. For the thermal insulation of single skin structures various flexible insulating liners, suspended boards, sprayed-on foams and other known means can be readily adopted.

In the joint structures of FIGS. 30–33 inclusive, the connecting surface means 97 and 100 are substantially coplanar with plane X—X which is perpendicular to plane Y—Y. Since the connecting surface means, as distinguished from the connecting surfaces per se, necessarily have some body or thickness, it is more accurate to consider that each connecting surface means have a plane of symmetry which is spaced from and parallel to plane X—X of the connecting surface per se. Nevertheless this plane of symmetry is of course perpendicular to plane Y—Y. Also, in some cases, as in the joint structures of FIGS. 26 to 29 inclusive, the connecting surfaces per se are not necessarily planar but the plane of symmetry of the surface portions **81*a*, 81*b* of the connecting surface means in FIGS. 26 and 27 and arcuate surface portions 96*a* of connecting surface means 96** in FIGS. 28 and 29 must in such case be perpendicular to plane Y—Y.

It follows from the foregoing that the connecting surface means of FIGS. 24 to 33 which are associated with one free side of a triangular portion 43 (see FIG. 1) each incorporate fastening element means, such as the means forming the bolt holes in FIGS. 24, 25 and 30 to 33 inclusive and the specially shaped surface portions **81*a* and 96*a* of FIG. 26 and FIG. 28, respectively, which are complementary in shape and position to fastening element means incorporated in the connecting surface means associated with that free side of the other triangular portion 43 which adjoins the first free side at the longitudinal nodal point, whereby contiguous structural components in the assembled structure can be connected together in either identical or reversed fold position by connection means, such as bolts 77 of FIG. 24, elements 84, 85 of FIG. 26, elements 90, 90*a* of FIG. 28, bolts 99 of FIG. 30 and bolts 101** of FIG. 32, which cooperate with the associated fastening element means.

FIG. 34 shows a part curved, part straight structural assembly of a plurality of single skin components with overlapping flange type joints, illustrating that the basic geometric principles of this invention apply to single skin components as well as to components having an appreciable thickness. The main circle **47*d* taken through nodal points E and G of a selected component 40*f* also contains apex J of the imaginary pyramid of the unit 40*f*, and each of the four joint flanges 100 of the component 40*f* is perpendicular to the corresponding side of the pyramid. For instance, the joint flange 100 extending between points E and F is perpendicular to the EFJ triangle, the flange extending between points E and H is perpendicular to the EHJ triangle, and so on. Consequently, each pair of joint flanges 100 which meet at one end of the fold line 41*f*, such as the two joint flanges 100** extending from E to F and from E to H, lie in the same plane, this plane being perpendicular to line EJ in the case of the two said joint flanges.

The structures' strength and stability may require that the number of bolts at each joint may be more than three, and that a plurality of bolts be grouped together near the ends of the joint flanges 100. FIG. 35 shows, by way of illustration, three bolts 105 grouped together using a common washer plate 106, which is preferably made of galvanized steel and is provided with an elastomeric sealantliner (not shown) when used on the outside of the joint. Furthermore, the individual bolts may be incorporated into a multiple connector member 108, as shown in FIG. 36, preferably made as a single steel casting and including elastomeric sealant liner 109 where member 108 is to be used on the outside of the joint. Since the bolts of such multiple connector member 108 are subjected to considerably greater shear than axial tension, some of the bolts may be left unthreaded, as shown in FIG. 36, to act only as shear dowels. It is self evident that further combinations of two or four such adjacent multiple shear connectors into a single casting are also possible, the combination of four such connectors providing a single nodal connector for the ends of all four joint flanges 100 which terminate at the same nodal point.

As an alternate end formation of a single skin component, the three fold lines which are converging to a longitudinal nodal point of the component may be terminated at a distance from that nodal point by rounding off the fold lines gradually as shown in FIG. 35 to avoid overstressing in the nodal area. Instead of having a sharp fold, the long fold line 41 may be bent with a radius, or as shown in FIG. 35, a valley plane 110 may also be formed along the long fold line. The term "folded" as used in this specification and appended claims embraces these departures from a folded configuration in a strict sense.

ALTERNATIVE JOINTS AND CONSTRUCTION METHODS

The various joints described and shown herein represent by way of illustration only a few of the possible embodiments of this invention which will enable those skilled in the art to find similar joints for the reversible connection of folded diamond components. Simple combinations of the illustrated joints may yield useful results, for instance the flange-type joint described for single-skin components can be adopted for double skin components as well.

I have discovered that where a closed joint is desired in folded plate constructions using plates of appreciable thickness, with each unit having a single joint surface along each side, there are only two abutting surface-to-surface connections possible. In one case, with the adjacent units connected in identical fold relationship, each single joint surface must be a hyperbolic paraboloid surface. Such joints are practical where the folded plate is formed of molded homogeneous material and perhaps in some other situations and where only cylindrical surface structures are desired, but for most commercial applications joints embodying the principles already described are far superior in respect to component manufacturing problems, erection problems and strength and permanence of the completed structure.

In the second case, where folded plate components having appreciable thickness are to be joined together with the fold angles facing alternately in the same direction and in reversed direction, the adjacent folded plate components can be joined in a closed satisfactory joint by forming the contiguous marginal portions of adjacent components as planar surfaces, the planar surfaces of noncontiguous sides of each component being in parallel planes, thereby forming prismatic shaped components. Of course this differs from the earlier described embodiments in which the planes are slightly inclined toward one another. Here again, since the folded plate components must in such case be connected with the fold angle facing alternately in the same direction and reversed direction and since the other desirable aspects of the various joints illustrated and described are lacking, this prismatic-type joint is not preferred.

The components may be strengthened with framing, internal grids, ribs, by corrugating the skins, and by other similar, conventional means. Longitudinal half units may be provided with additional means along their longest edge for further strength, or to facilitate the connection of end walls, which may be of any conventional design, but may also be assembled from folded diamond components.

SPACE FRAME

To increase the structures' strength and stiffness in the direction perpendicular to the components' fold lines 41, transversal stiffener members may be secured to the structures' nodal points 45. The stiffener members may be cables if they are subject to tension only, however, they are generally made of a tube 87 as seen in FIG. 30 or of angle or channel shape. The transversal stiffener members may be used in short lengths to reinforce the folds of the marginal units at the structure's free edges only, or they may be continuous from one end of the structure to the other. If such continuous stiffeners 87 are used at every row of nodal points 45 of a structure, they effectively convert the essentially folded plate structure into a space frame, thereby not only increasing structural strength in the direction of the folds, but enabling the structure to carry its loads in the transversal direction as well, so that the structure may be supported at corner points only and it may be subjected to concentrated loads applied at the nodal points. FIG. 37 is a perspective view of such a horizontal, flat space frame assembly. All the various structural configurations of this invention can be similarly converted into space frames by the use of transversal stiffener members 87.

The loadbearing capabilities of flat structural assemblies can be substantially increased by the use of tensioning cables 112, attached to the underside of the structure as shown in FIG. 38, and post-tensioned after the structure has been assembled. The initial stresses caused by such post-tensioning force are the opposite of those caused by external loading and therefore the two types of stresses will tend to cancel out each other. Post-tensioning also reduces deflections due to heavy snow load, by creating an initial upward curvature or camber. This camber also facilitates drainage of the roof.

Because of their exceptional economy and stiffness against deflections when they are built for long spans, the use of space frames is rapidly increasing. Space frames of the prior art can generally be utilized as supporting structural framework only, requiring an additional, superimposed roof to provide weathershield, thermal insulation, space separation, etc. The space frames of this invention satisfy all functional requirements simultaneously and offer enclosed spaces which are weathertight and habitable immediately upon assembly. Furthermore, the folded plate action gives increased buckling resistance for the compression members in the direction of the folds. Therefore such members can be made longer and the nodal points can be spaced farther apart, allowing a corresponding reduction in the number of transversal members as well. A further advantage is a higher degree of prefabrication under controlled factory conditions and greater savings in labor than was made possible by the prior art, since the components of this invention combine a number of individual frame members, roofing elements and means for thermal insulation and waterseal into a single, multi-purpose, factory-finished component.

USES, ERECTION, GENERAL ADVANTAGES

The uses for which the various structures of this invention can be built are numerous. In addition to building type enclosures and portions thereof, such as walls and roofs, the uses include revetments, retaining walls, cantilevered canopies, tunnels, culverts, and other underground constructions, earth covered shelters, tanks for liquids and bridges both elevated and floating. Toys and scale models for demonstration, testing instruction and amusement can also incorporate the principles of my invention. For all these various uses a single type of folded diamond component can be standardized and mass produced without having to standardize the structures themselves. For ultimate material economy, the dimensionally identical, interchangeable components can be manufactured in several different strength grades. For instance, single skin steel components may be made of plates having different ultimate stress or different thickness, without changing either the manufacturing or the erection process. The components' simple, nesting shape requires minimum shipping or storage space.

Assembly of the various structures is extremely simple, many can be assembled from a single drawing or photograph, requiring little or no field measurements, special tools or heavy lifting equipment. The structures can be assembled entirely on the ground, titled up gradually as assembly progresses, or lifted up after assembly is completed; therefore the need for temporary erection scaffolding or shoring is reduced or altogether eliminated.

It will be apparent that some of the advantages of the present invention can be achieved in the field in the erection of folded plate component structures by utilizing components having any desired marginal configuration and accommodating these components to one another in the erection of structures by using adapters between contiguous marginal portions of such components.

The term coplanar is used to describe planes which coincide with each other or are in closely spaced parallel relation, where the spacing between the planes is inconsequential relative to the principles of the present invention. The term parallel is used in respect to planes where the planes are exactly parallel or practically so for purposes of the principles of the present invention.

The plane of symmetry which includes the fold line of each of the folded diamond components making up the illustrated structures is vertically disposed, i.e., in perpendicular relation to a horizontal plane. However, it will be obvious that the components can be used in structures where these planes of symmetry are disposed horizontally or at an angle to the vertical or the horizontal. In any event contiguous components will obviously have their planes of symmetry disposed in perpendicular relation to a single plane, whether a horizontally, vertically or otherwise disposed plane. Therefore in the claims the disposition of the planes of symmetry of the components making up structures in accordance with the teachings of the applicant's invention is defined as being perpendicular to a common reference plane.

I claim:

1. A structural component comprising:

(a) a symmetrical quadrilateral shaped plate member folded along a diagonal of symmetry to form two similar triangular portions which adjoin each other along the fold line and lie in intersecting planes disposed at equal angles to the plane of symmetry of the component which includes the fold line, (b) a marginal portion on each free side of each triangular portion, (c) connecting surface means on each marginal portion, each such connecting surface means being structurally complementary to each of the other connecting surface means for connection with contiguous connecting surface means of one of a plurality of contiguous corresponding components in either one of only two positions, one position being with two associated triangular portions of the structural component and a contiguous corresponding structural component lying in substantially the same plane, the other position being with two associated triangular portions of the structural component and another contiguous corresponding structural component disposed at an angle to one another such that said plane of symmetry of the structural component and said plane of symmetry of the other contiguous corresponding structural component are both perpendicular to a common reference plane.

2. A structural component as claimed in claim 1 wherein the plate member comprises an insulating core enclosed within two parallel skins, and the marginal portions comprise extensions of the skins.

3. A structural component as claimed in claim 2 wherein the marginal portions of the plate member comprise a rigid internal frame and the connecting surface means comprise peripheral elements of said frame.

4. A structural component as claimed in claim 1 wherein the two triangular portions of the plate members are formed of homogeneous material.

5. A structure comprising a plurality of components as described in claim 1 in which (d) connection means coact with contiguous connecting surface means (c) of adjacent components of the structure to hold all the components together with the folds of all components facing in the same direction.

6. A structure comprising a plurality of components as described in claim 1 in which (d) connection means coact with contiguous connecting surface means (c) of adjacent components of the structure to hold all the components together with the folds of a plurality of the components in reversed fold position relative to the fold position of the other components.

7. A structure comprising:

(a) a plurality of contigous structural components, each component comprising a symmetrical quadrilateral shaped plate member folded along a diagonal of symmetry to form two similar triangular portions which adjoin each other along the fold line and lie in intersecting planes disposed at equal angles to the plane of symmetry of the component which includes the fold line, (b) a marginal portion on each free side of each triangular portion, (c) each marginal portion on one component coinciding with a marginal portion on one of four contiguous components, (d) connecting means on each marginal portion of the one component and each one of the coincident marginal portions of the contiguous components, each of the connecting means of the one component comprising surface means shaped to complement corresponding surface means on each of the contiguous connecting means of the contiguous components with contiguous triangular portions of the one component and the contiguous components disposed in either one of only two positions, to wit, either in substantially coplanar relationship to one another or at a common angle to one another, the common angle being such that said plane of symmetry of the structural component and said plane of symmetry of the other contiguous corresponding structural component are both perpendicular to a common reference plane, and (e) connection means acting between the connecting means holding the connecting means of the one component and the connecting means of the contiguous components in connected relation with a triangular portion of at least one contiguous component and the associated contiguous triangular portion of the one component disposed in substantially coplanar relationship.

8. A structure as claimed in claim 7 wherein each triangular portion has a center plane and each of the connecting means of the one component and the associated connecting means of the contiguous components has a surface in at least linear contact with the corresponding surface of the associated connecting means, which linear contact falls in both center planes of the associated triangular portions.

9. A structure as claimed in claim 7 wherein longitudinal and transversal halves of the components constitue the periphery of the structure.

10. A structure as claimed in claim 7 wherein the triangular portions of the plate members are formed of homogeneous material.

11. A structure as claimed in claim 7 wherein the triangular portions of the plate members are of sandwich construction.

12. A structure as claimed in claim 7 wherein the marginal portions of each component constitute a rigid framework for the component.

13. A structure comprising:

(a) a plurality of contigous structural components, each component comprising a symmetrical quadrilaterial shaped plate folded along a diagonal of symmetry to form two similar triangular portions which adjoin each other along the fold line and lie in planes disposed at equal angles to the plane of symmetry of the component which includes the fold line, (b) each triangular portion having two apices in common with the other triangular portion at the fold line to form longitudinal nodal points of the component, (c) the third apex of each triangular portion forming a transverse nodal point on the associated side of the component, (d) each triangular portion having free sides joining the transverse nodal point and the longitudinal nodal points, free sides of adjacent components being contiguous,
(e) connecting surface means on contiguous free sides of adjacent triangular portions, and
(f) connection means coacting with contiguous connecting surface means to hold adjacent components in connected relation with the planes of symmetry of all the connected components perpendicular to a common reference plane,
(g) at least one of the components of the structure being in reversed fold position relative to the fold position of the other components of the structure.

14. The structure of claim 13 in which:
(h) an elongated stiffener member is connected between transverse nodal points of each of a plurality of components of the structure.

15. The structure of claim 13 in which:
(h) the components are arranged in rows, and
(i) all the components of one row are in reversed fold position relative to all the components of the row next to the one row.

16. The structure of claim 13 in which:
(h) tension means extend parallel to the planes of symmetry of the components and span a plurality of the components, and
(i) means connect the extremities of the tension means to place the tension means under a sufficient tensional stress to arch the structure over the length of the span.

17. A structure as claimed in claim 13 in which:
(h) connection means coact with contiguous connecting surface means of adjacent components to hold the components in rows extending transversely to said planes of symmetry of the components, and
(i) the components in alternate rows are held in reversed fold position.

18. The structure of claim 17 in which:
(h) tension means extend parallel to the planes of symmetry of the components and span a plurality of the components, and
(i) means connect the extremities of the tension means to place the tension means under sufficient tensional stress to arch the structure over the length of the span.

References Cited

UNITED STATES PATENTS

| | | | |
|---|---|---|---|
| 2,073,358 | 3/1937 | Williamson | 52—82 |
| 2,682,235 | 6/1954 | Fuller | 52—81 |
| 2,962,133 | 11/1960 | Kivett | 52—584 |
| 3,026,651 | 3/1962 | Richter | 52—81 |
| 3,057,119 | 10/1962 | Kessler | 52—86 |
| 3,186,524 | 6/1965 | Spaeth | 52—86 |
| 3,203,144 | 8/1965 | Fuller | 52—81 |
| 3,204,372 | 9/1965 | Richter | 52—80 |
| 3,353,318 | 11/1967 | Bacher | 52—403 |
| 3,374,588 | 3/1968 | Alfrey | 52—81 |

FOREIGN PATENTS

| | | | |
|---|---|---|---|
| 653,204 | 1962 | Canada | 52—80 |
| 1,164,375 | 1958 | France | 287—189.36F |
| 1,408,330 | 1965 | France | 52—81 |

OTHER REFERENCES

Machinery's Handbook by Horton and Schulbert pp. 52 and 53.

PRICE C. FAW, Jr. Primary Examiner

U.S. Cl. X.R.

52—64, 241